United States Patent [19]

Pletscher

[11] Patent Number: 5,005,675
[45] Date of Patent: Apr. 9, 1991

[54] SELF-ASSISTING RIM BRAKE FOR BICYCLES

[75] Inventor: Oskar Pletscher, Marthalen, Switzerland

[73] Assignee: Gebruder Pletscher AG, Marthalen, Switzerland

[21] Appl. No.: 369,327

[22] Filed: Jun. 21, 1989

[30] Foreign Application Priority Data

Jun. 22, 1988 [CH] Switzerland ............... 02400/88-0

[51] Int. Cl.⁵ .............................................. B62L 1/12
[52] U.S. Cl. ............................. 188/24.14; 188/72.2
[58] Field of Search ............... 188/24.14, 24.15, 24.16, 188/72.2, 136

[56] References Cited

U.S. PATENT DOCUMENTS 4,055,235 10/1977 Tanaka et al. ................... 188/24.14

FOREIGN PATENT DOCUMENTS 1116558  5/1962 Fed. Rep. of Germany .... 188/2414
0904471  3/1945 France ........................... 188/72.2
 900660  7/1945 France ........................... 188/72.2
0905400 12/1945 France ........................... 188/24.14

*Primary Examiner*—Duane A. Reger
*Attorney, Agent, or Firm*—Bell, Seltzer, Park & Gibson

[57] ABSTRACT

A pair of brake shoes (36) arranged opposite one another are intended for engaging the side faces of a rim (F) and are each fastened to the end region of an arm (30, 31) of a brake caliper (29). The arms (30, 31) are jointly pivotable, counter to the effect of a restoring spring (47), in a plane at a right angle to the direction of frictional force, and moreover the brake shoes are displaceable to a restricted extent in a direction at a right angle to the pivoting plane. The arms (30, 31) interact with a sloping face (23, 24), in order, during the displacement of the brake shoes (36), to be pressed against the corresponding side face of the rim (F) in an assisted manner. To reduce the danger that the arms (30, 31) will jam during the application of the brake and that consequently the braked wheel (11) will lock, the end regions of the two arms (30, 31) are each supported on a sloping face (23, 24) via a freely rotatable roller (51), these sloping faces (23 24) converging in the direction of frictional force and are anchored firmly to the bicycle frame (12, 13). The arms (30, 31) are each pivotable about their own pivot pin (33, 34'), and the sloping faces (23, 24) and rollers (51) are arranged between the respective brake shoe (36) and the pivot pin (33, 34').

6 Claims, 2 Drawing Sheets

SELF-ASSISTING RIM BRAKE FOR BICYCLES

FIELD OF THE INVENTION

The present invention relates to a self-assisting rim brake for bicycles.

BACKGROUND OF THE INVENTION

A self-assisting rim brake is disclosed in French Patent Specification 900,660. In this known rim brake, two arms of a brake caliper are pivotable about a common pivot pin and tiltable about an axis which is approximately at a right angle to the axis of the pivot pin. Rollers are provided on the arms for engaging sloping faces on fixed supports adjacent each side of the wheel so as to provide additional braking force when the brakes are applied. However, in this arrangement, the arms have bores overlying the pivot pin which must be substantially oversized to provide the play necessary to allow the arms to tilt. This play also allows for unsynchronous pivot movement of the arms during operation. Furthermore, the sloping faces and the rollers are arranged level with the brake shoes. As a result, the length of the lever arms between the pivot pin and the brake shoes is approximately equal to the lever arm between the pivot pin and the sloping faces or the rollers. Therefore, the dimension of the restoring spring for bringing the brake shoes into their initial position is very difficult to determine. If the spring is made too weak, the brake remains in its braking position and the brake shoes will wedge between the sloping faces and remain wedged until the direction of rotation of the braked rim is reversed. Clearly this practice is impractical if not virtually impossible. In contrast, if the restoring spring is made too strong, the braking force exerted by the operator becomes higher and the assisting effect of the sloping faces is also impaired.

The same problems exist in the rim brake which is disclosed in German Patent Specification 1,116,558. In this arrangement, the arms of the brake caliper are pivotable about a common pin and additionally are displaceable along the pin against an elastic compression bumper positioned on the pin. The two brake shoes include a holder in which a brake block is anchored. The holders include a sloping face formed at one end which engage the spars of the bicycle frame. When the brake blocks are pressed against the rim, the arms of the brake caliper tend to shift along the pin against the elastic compression bumper. The result of this displacement is that the sloping faces of the holders engage the frame spars and the brake shoes are pressed firmly against the rim. According to the design, when the brake is released, a restoring spring is supposed to push the arms of the brake caliper back into the initial position. In practice, however, the dimensioning of the restoring spring presents problems. If it is too weak, the arms of the brake caliper wedge between the spars of the frame locking the wheel. The wheel even remains locked after the brake is released. In contrast, if the restoring spring is made too strong, the self-assisting effect is substantially reduced if it occurs at all. In addition, the self-assisting effect is also dependent on the friction between the sloping faces and the spars. The friction is dependent on, among other things, the weather conditions and any soil buildup, therefore the braking force will be inconsistent.

Accordingly it is an object of the present invention to provide an improved self-assisting rim brake which avoids the drawbacks of the prior art as discussed above.

It is a more particular object of the present invention to provide an improved rim brake of the type mentioned in the introduction, in such a way that the self-assisting effect is virtually independent of the dimensioning of the spring and is substantially consistent under all weather conditions.

SUMMARY OF THE INVENTION

The above and other objects of the present invention are achieved by a self-assisting rim brake for bicycles, which includes a pair of mutually opposite brake shoes for frictionally engaging the opposite side faces of the rim of a bicycle tire and defining a direction of frictional force. The brake shoes are anchored to end regions of an arm of a brake caliper. The two arms of the brake caliper are jointly pivotable counter to the effect of a restoring spring in a pivot plane formed essentially at a right angle to the direction of frictional force. The brake shoes are displaceable to a restricted extent in a direction generally at a right angle to the pivot plane. The arms each interact with a sloping face converging in the direction of frictional force, so that displacement of the brake shoes against the corresponding side faces of the rim is assisted by the two arms each being supported by a freely rotatable roller on an associated sloping face anchored firmly to the bicycle frame. Each of the arms is pivotable about its own pivot pin and means are provided for controlling the pivoting movement of the arms positively in opposite directions. The sloping faces and the rollers are further arranged between the brake shoes and the respective pivot pins.

BRIEF DESCRIPTION OF THE DRAWINGS

While some of the features and advantages of the invention have been stated, others will become apparent as the description proceeds when taken in conjunction with the following drawings in which—

DETAILED DESCRIPTION OF THE PREFERRED EMBODIMENT

Figure 1:
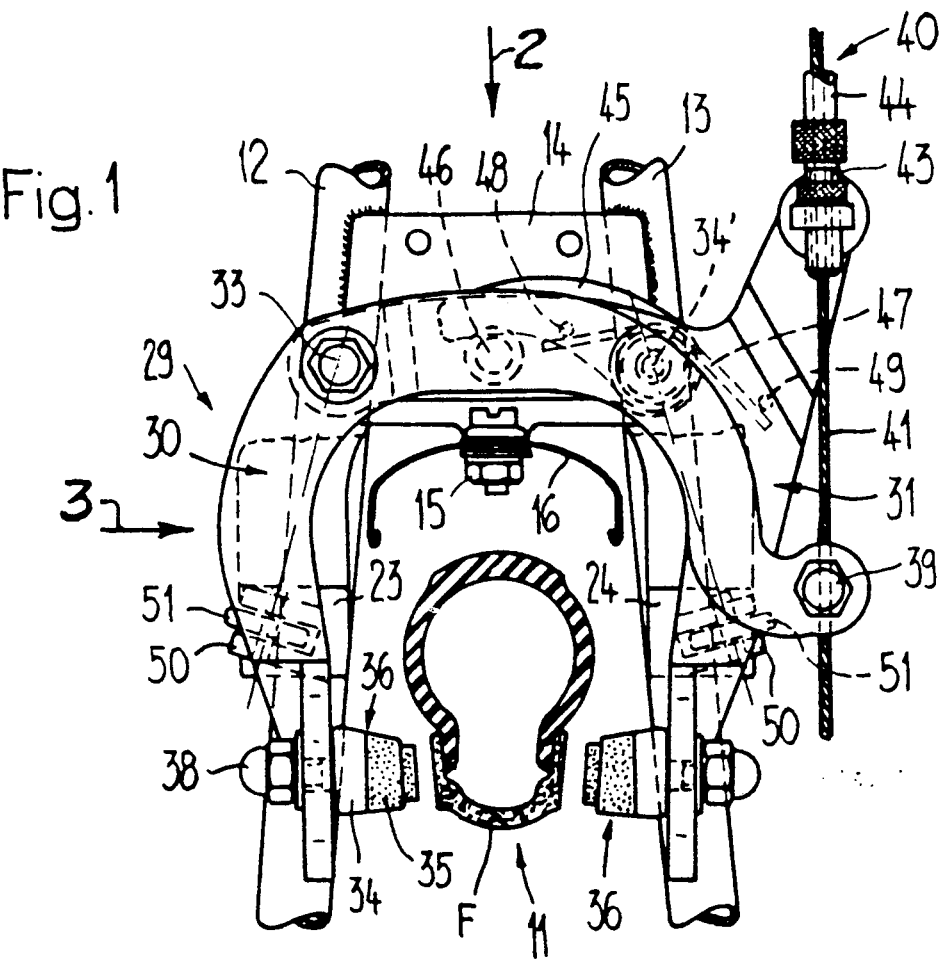
FIG. 1 is a fragmentary front elevational view of a self-assisting rim brake embodying the features of the present invention mounted adjacent the rear wheel of a bicycle with the wheel illustrated in cross section.
Figure 2:
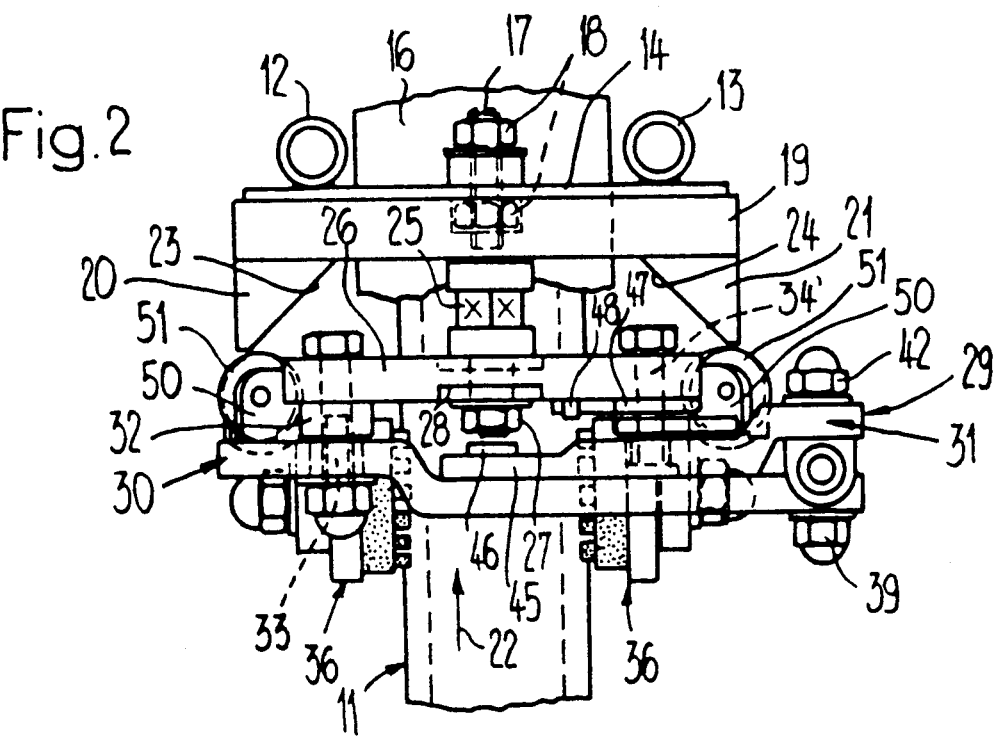
FIG. 2 is a fragmentary top view of a self-assisting rim brake taken in the direction of the arrow 2 of FIG. 1.
Figure 3:
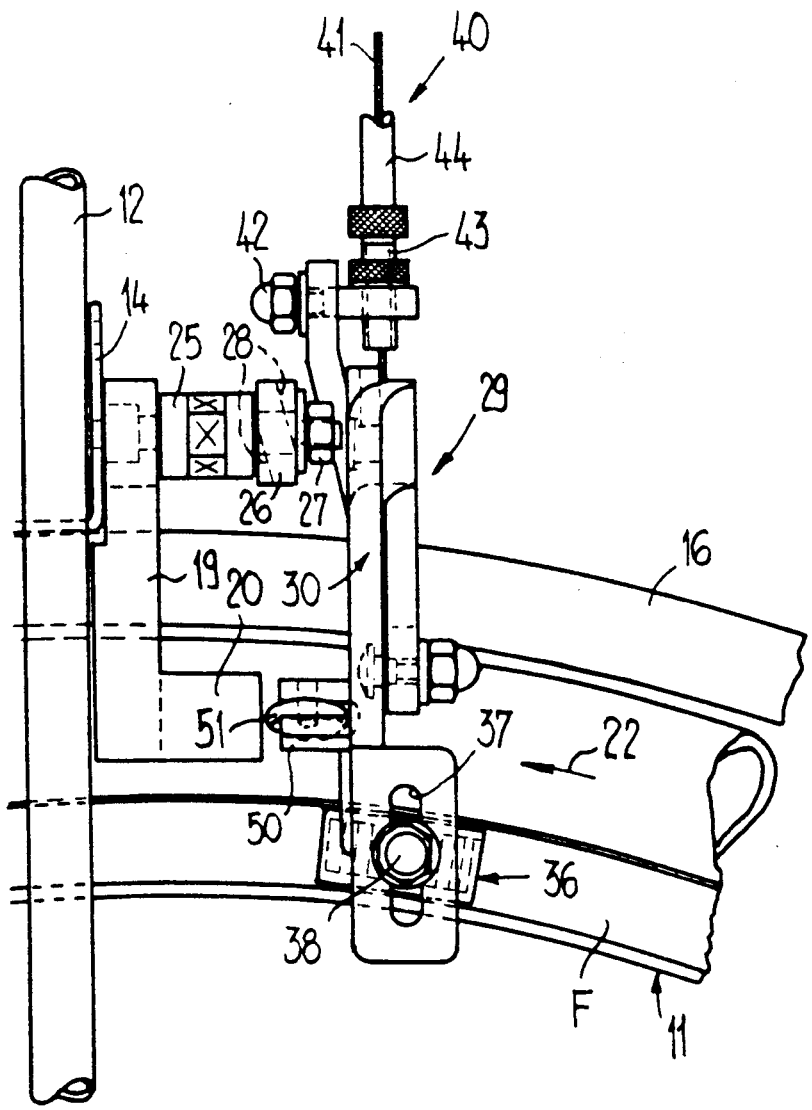
FIG. 3 is a fragmentary side view of the self-assisting rim brake taken in the direction of the arrow 3, omitting certain parts for clarity.

Referring to the drawings, FIGS. 1, 2 and 3 illustrate a preferred embodiment of a self-assisting rim brake for a bicycle. Two spars 12, 13 of a bicycle frame which lead to a hub (not shown) are positioned on opposite sides of a rear wheel 11 of the bicycle. The spars 12, 13 are connected to one another by a welded-on fastening plate 14. The plate 14 has a bent tab (FIG. 3) which extends between the spars 12, 13 to support a mudguard 16 over the rear wheel 11 by means of a screw connection 15.

A rigid yoke 19 having essentially the form of an inverted U is fixed by means of a central screw bolt 17 and nuts 18 to the flat side of the plate 14 parallel to the spars 12, 13. The (lower) ends of the legs of the yoke 19 are equipped with wedge-shaped pieces 20, 21 (FIG. 2)

fastened to or formed thereon. These wedge-shaped pieces 20, 21 are arranged generally symmetrically with the rim (F), have planar sloping faces 23, 24 directed toward the rear wheel 11 and converging in the direction of rotation indicated by the arrow 22.

The screw bolt 17 extends beyond the yoke 19 and carries an intermediate or spacer piece 25, then passes through a bridge 26 which follows the spacer piece 25 and which is retained by means of a nut 27. The bridge 26 includes a center bore through which the bolt 17 passes. The center bore has play relative to the bolt 17 and terminates at both ends in planar milled-out portions 28. The bridge 26 is thereby tiltable to a restricted extent in the clockwise direction about a generally horizontal axis at a right angle to the bolt 17 and the drawing plane of FIG. 3.

The bridge 26 carries the brake caliper 29, the arms of which are designated by 30 and 31 in FIGS. 1 and 2. The arm 30 is pivotable about a pin 33 anchored in one end of the bridge 26 and passing through a spacer piece 32. On the other hand, the arm 31 is pivotable about a pin 34' anchored in the other end of the bridge 26. In contrast to conventional rim brakes, the arms 30, 31 of the brake caliper 29 are not pivotable about a common pivot or hinge pin. However, the arms 30, 31 pivot in a pivot plane which is generally perpendicular to the bolt 27.

The arm 30 has the form of a curved two-armed lever, to the end of which a brake shoe 36 composed of a holder 34 (FIG. 1) and of a brake block 35 is anchored adjustably by means of a screw connection 38 passing through a long hole 37 (FIG. 3). At the other end of the arm 30 there is a clamping screw 39 for the end of a cable 41 of a Bowden pull 40 provided for actuating the brake.

The arm 31 of the brake caliper 29 is likewise, in principle, a two-armed lever which is pivotable about the pin 34' and which at its lower end carries a brake shoe 36 designed and fastened to the arm 31 in the same way as the brake shoe 36 is fastened to arm 30. At the other end, the arm 31 carries the adjustable and lockable holder 43 anchored by means of a screw connection 42 and intended for the cable sheath 44 of the Bowden pull 40. Furthermore, the arm 31 is equipped with an extension 45 which engages over a short stud 46 fastened to the arm 30. This arrangement guarantees a mutual synchronization of the pivoting movement of the arms 30 and 31

A spiral spring 47 with projecting ends is wound in one turn around the pivot pin 34'. One end of the spiral spring 47 is supported on a stud 48 projecting from the bridge 26, and the other end is supported on a stud 49 (FIG. 1) anchored to the arm 31 on its side facing the bridge 26. The spiral spring 47 thus acts as a restoring spring directly for the arm 31 and indirectly for the arm 30 via the extension 45 of the arm 31 and the stud 46.

The flat sides of the arms 30, 31 facing the spars 12, 13 are equipped, in the region between the brake shoes 36 and the respective pivot pins 33, 34', with bearing lugs 50, in which rollers 51 are mounted freely rotatably. At the same time, the roller 51 present on the arm 30 is supported on the sloping face 23 and that on the arm 31 is supported on the sloping face 24. As should be apparent from FIG. 1, the axis of rotation of the rollers 51 are aligned to intersect with the axes of pivot pins 33, 34' of the respective arms of the brake caliper 29. When the brake is applied by means of the Bowden pull 40, (in FIG. 1) the arm 30 is pivoted in the counter-clockwise direction and the arm 31 in the clockwise direction counter to the effect of the spiral spring 47. The brake blocks 35 of the brake shoes 36 come in contact with the lateral flat sides or rim horns of the rim F of the rear wheel 11. The brake shoes 36 thereby experience a frictional force which has the same direction (arrow 22) as the rotation of the wheel 11. The amount of this frictional force depends on the force exerted in order to actuate the brake. This frictional force causes the bridge 26 to execute a tilting movement and consequently the brake shoes to experience a displacement in the direction of the arrow 22. However, since the arms 30, 31 are supported on the convergent sloping faces 23, 24 via the rollers 51 in the region of the brake shoes 36, the pressing force of the brake blocks 35 against the side faces of the rim is thereby assisted automatically and without the external exertion of force. Because of the rollers 51, the friction is reduced to a minimum value between the arms 30, 31 and the associated sloping faces 23, 24. To obtain the displacement of the brake shoes 36 in the direction of rotation, it is not necessary to shift the entire arms 30, 31, but it is sufficient for the bridge 26 to execute the tilting movement. To release the brake shoes 36 from engagement with the rim F, the restoring spring 47 is sufficient, and this also ensures that the tilting movement of the bridge is cancelled.

In the drawings and specification there has been set forth a preferred embodiment of the invention, and although specific terms are employed, they are used in a generic and descriptive sense only and not for purposes of limitation.

That which is claimed is:

1. A self-assisting brake for selectively engaging the wheel rim of a bicycle, and comprising a pair of caliper type brake arms, with each of said arms including a lower end portion, and with each of said arms mounting a brake shoe mounted at the lower end portion thereof, means mounting said brake arms to the frame of the bicycle, with the lower end portions and brake shoes being located on respective opposite sides of the wheel rim, and for pivotal movement about respective, laterally spaced apart pivotal axes which extend generally parallel to the plane of rotation of the wheel rim so as to permit movement of said arms in a first pivotal plane lying perpendicular to the plane of rotation of the wheel rim and between a braking position wherein the brake shoes engage the wheel rim and an open position spaced from the wheel rim, and while permitting limited pivotal movement of said brake arms in a second pivotal plane which lies parallel to the plane of rotation of the wheel rim and such that said brake shoes are able to move in the direction of movement of the wheel rim, manually operable means for moving said brake arms from said open position to said braking position, and spring biasing means for biasing said brake arms toward said open position, a pair of cam surfaces fixed mounted to the frame of the bicycle at laterally space apart locations on opposite sides of the wheel rim and forwardly of said brake arms when viewed in the forward rotational direction of said wheel rim, with the cam surfaces being generally aligned with respective ones of the lower end portions of said brake arms and positioned so as to lie between the associated brake shoe and the pivotal axis of the associated brake arm, and with said cam surfaces converging toward each other in the forward rotational direction of the wheel rim, and a pair of rollers mounted to respective ones of said lower end portions of said brake arms and being aligned with respective ones of said cam surfaces, whereby movement of the brake arms to said braking position during operation of the bicycle causes the brake shoes to engage the rotating wheel rim, which in turn causes said brake shoes to move in the forward rotational direction and said rollers to engage said cam surfaces, thereby camming the brake shoes against the wheel rim with an increased force.

2. The self-assisting brake as defined in claim 1 wherein each of said rollers defines a rotational axis which perpendicularly intersects the pivotal axis of the associated brake arm.

3. The self-assisting brake as defined in either one of claims 1-2 wherein said cam surfaces are each substantially planar and are symmetrically positioned on opposite sides of the plane of rotation of the wheel rim.

4. The self-assisting brake as defined in claim 3 wherein said cam surfaces each define an angle of about 45 degrees with the plane of rotation of the wheel rim.

5. The self-assisting brake as defined in claim 3 wherein said means mounting said brake arms to the frame of the bicycle includes a laterally extending bridge which is pivotally mounted to the frame for movement in said second pivotal plane, and with said brake arms each being pivotally mounted to said bridge so as to define said laterally spaced apart pivotal axes.

6. The self-assisting brake as defined in either one of claims 1-2 wherein said laterally spaced apart pivotal axes of said brake arms are located on respective opposite sides of the plane of rotation of the wheel rim.

* * * * *

UNITED STATES PATENT AND TRADEMARK OFFICE
CERTIFICATE OF CORRECTION

PATENT NO. : 5,005,675
DATED : April 9, 1991
INVENTOR(S) : Oskar Pletscher

It is certified that error appears in the above-identified patent and that said Letters Patent is hereby corrected as shown below:

Column 3, line 27, "27" should be -- 17 --
Column 3, line 60, "treely" should be -- freely --

Signed and Sealed this

Twenty-ninth Day of September, 1992

Attest:

DOUGLAS B. COMER

*Attesting Officer*  *Acting Commissioner of Patents and Trademarks*